March 26, 1946.     E. A. STALKER     2,397,215
AIRCRAFT
Filed May 13, 1943
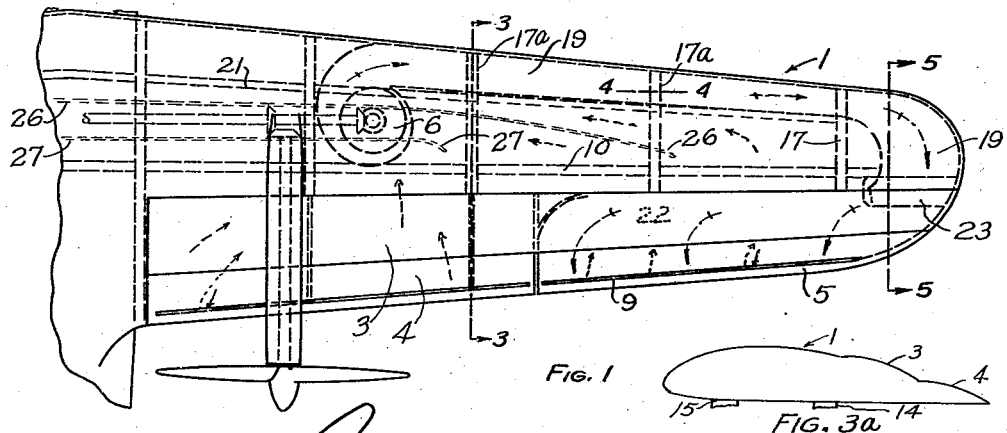
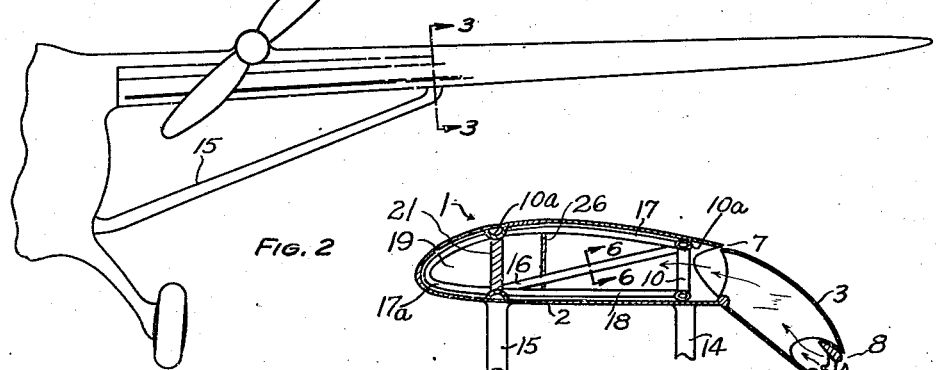
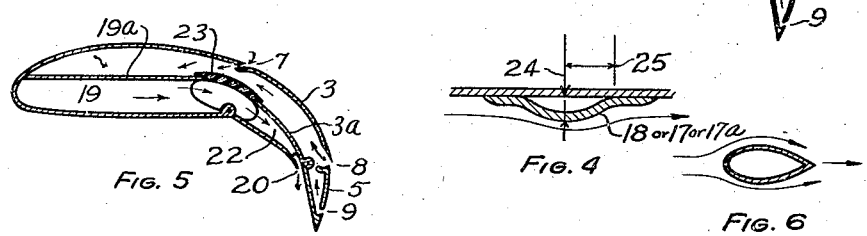
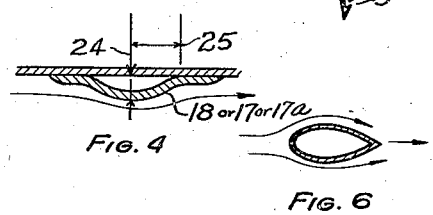
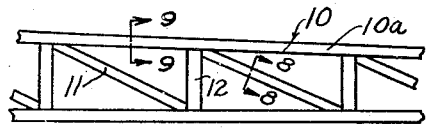
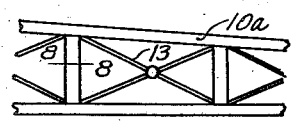
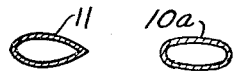
INVENTOR
Edward A. Stalker
By Morechel & Biebel
ATTORNEYS Patented Mar. 26, 1946

2,397,215

UNITED STATES PATENT OFFICE 2,397,215

AIRCRAFT

Edward A. Stalker, Bay City, Mich.

Application May 13, 1943, Serial No. 486,791

3 Claims. (Cl. 244—40)

My invention relates to wing structures for boundary layer control wings and has for its objects, first, to provide a firm and substantial wing structure having slots for inducting the boundary layer and providing for an internal flow from the suction slots with a minimum power loss; and second, to provide such a structure having discharge slots which will accommodate a flow to the discharge slot with little loss of energy while affording proper strength and stability. Other objects will appear from the description and drawing.

In providing wings with serially hinged flaps, as disclosed in my application, Serial Number 313,967 filed January 15, 1940, difficulty has heretofore been encountered in providing a suitable passage way for the inducted air while providing at the same time a structure adequate to carry the lift, drag and other loads encountered in operation. Contemporary thought has suggested simply to punch circular or other-shaped holes in the web of the spars. This practice would be very wasteful of energy in any case because of the rapid expansion of the downstream side of the web, but when the volume handled becomes large, it is prohibitive.

I have devised a type of structure which permits a large volume flow from the suction slots, and a large volume flow to the discharge slots, both with a negligible or exceptionally small loss of energy within the wing, while at the same time the structure may be made of adequate strength and with substantial freedom of design to support such loads as are encountered.

I attain the objects of the invention by the means illustrated in the figures in which:

Fig. 1 is a plan view of a preferred wing;

Fig. 2 is front view of the wing;

Fig. 3 is a section along the lines 3—3 in Figs. 1 and 2 with the flaps depressed;

Fig. 3a is an outline view similar to Fig. 3 but with the flaps raised;

Fig. 4 is a detail sectional view along lines 4—4 in Fig. 1;

Fig. 5 is a sectional view along the line 5—5 in Fig. 1;

Fig. 6 is a detail sectional view along line 6—6 in Fig. 3;

Fig. 7 is a fragmentary elevation of the rear spar of the preferred wing viewed from the nose of the wing;

Fig. 8 is a section along the line 8—8 in Fig. 7;

Fig. 9 is a section along line 9—9 in Fig. 7; and

Fig. 10 is a fragmentary elevation of a modified spar type.

Each of the wings 1 is comprised of the main body 2 and the flaps 3 and 4 suitably arranged in tandem relation and adjustably mounted with respect to each other and to the wing main body. The upper surface of the main body and of each of the flaps is provided with a generously curved surface having a substantial radius of curvature, in excess of the thickness of the wing adjacent thereto. This provides the scalloped appearance of the wing in the raised position of the flaps, and provides for establishing a highly cambered wing with a substantially smooth and continually curved upper surface when the flaps are depressed. As shown they may be depressed to deflect the relative wind through an angle of up to approximately 90°.

Outwardly of flap 4 and adjustably secured at the trailing end of forward flap 3 is the aileron 5. The aileron is constructed similarly to the flap 4, and has a similarly curved upper surface. It is arranged to be controlled by the pilot, separately from the flaps with the ailerons on opposite wings being differentially actuated while the controls for the lift flaps 3 and 4 on opposite wings provide for similar actuation thereof.

A blower 6 is provided which is located at a suitable position within the hollow wing and serves to induct the boundary layer on the wing surfaces. This is effected through the provision of upper surface slots 7, 8 and 9. Slot 7 is located adjacent the trailing end of the wing main body and the leading end of lift flap 3. Slot 8 is preferably located adjacent the trailing end of flap 3 and the leading ends of the flap 4 and the aileron 5, respectively. Slot 9 is preferably located adjacent the rearmost portion of the upper wing surface comprising flap 4 and aileron 5. These slots severally provide for the induction of the boundary layer on the portions of the wing in advance of the respective slots, thereby causing the relative wind to follow the wing contour.

With a wing constructed to have the high camber as shown in Fig. 3, for example where the relative wind is deflected through an angle of approximately 90 degrees, it is desirable to provide a smooth and relatively clear and uninterrupted path of flow for the air passing through the slot and the wing interior. This is for the reason that a large volume of flow is desired to be attained, particularly in the high lift position of the wing as shown in Fig. 3, and unless the resistance to such flow is reduced, there is a substantial loss of energy by reason of the internal resistance to such flow.

Likewise it is necessary to have a rigid spar construction at the rear of the wing main body to provide the necessary strength and rigidity to sustain the loads from the flaps. While requiring this substantial mechanical construction, the freedom of airflow through the structure must likewise be attained.

A form of spar construction for this purpose is shown generally at 10, and comprises chord members 10a extending spanwise of the wing adjacent the upper and lower surfaces thereof. The chord members 10a are preferably oval shaped tubes such as shown in Fig. 9, with the lattice members 11 and 12 being of streamlined shape substantially as shown in Fig. 8. Preferably the major axis of the cross-section of both chord and lattice members is generally aligned with the local flow direction which varies along the span, but can be determined readily with threads or with a directionometer.

An alternative arrangement is shown in Fig. 10 where the chord members and the vertical supports are the same as described above, but in which the lattice members are replaced by streamlined wires 13.

At the locality where the lift struts 14 and 15 attach, a rigid frame is formed chordwise to confer drag and torsional rigidity on the tube-like structure formed by the front and rear spars and the upper and lower covers of the wing. The diagonal 16 has the streamline shape as shown in Fig. 6. The top and bottom members 17 and 18 of this frame have the cross-sectional shape as shown in Fig. 4.

The channel-like members 17 and 18 have a shallow depth so as to present a streamline form to the flow. As shown in Fig. 4, the ribs 17 and 18 are each arched in the direction of the flow of air through the wing interior i. e., generally spanwise of the wing, with the maximum depth 24 of the rib being substantially less than the downstream extent 25 of the arched contour. Thus the dimension 24 is preferably made one-half or less of the dimension 25, and the outer extremities of the rib may be joined to the adjacent skin either by welding, riveting or in any other suitable manner.

The blower 6 is arranged to discharge into a duct 19 which leads from the blower outwardly along the leading edge of the wing to the outer end thereof. A partition wall 21 formed in the vertical plane of the forward chord members 10a and immediately above strut 15, provides for segregating the flow passage through which the discharge takes place. The front spar 21 terminates inboard from the wing tips as shown in Fig. 1. Because of the taper of the wing thickness, the duct decreases in depth outwardly toward the tip, and an auxiliary wall 19a is provided as shown in Fig. 5 to confine passage 19 to the lower portion of the wing cross-section. A flexible element 23 of rubber or the like forms a tube with the lower wall of the wing to which it is cemented, providing a continuous closed passage leading from duct 19 to the duct 22 within flap 3. An outlet discharge slot 20 adjacent the trailing end of flap 3 provides for the discharge of the air delivered by the blower on the lower side of the wing.

The interior of the wing is divided in a special manner. The forward partition or spar 21, and the additional partition 26 and 27 extend in spaced relation to each other across the top of blower 6 where they are notched to accommodate the blower. These partitions divide the blower inlet area by cutting across the same end segregating it into portions approximately proportional to the length of the slot to be served. Thus partition 26 defines a forward portion of the blower inlet area which is proportioned approximately to the area of slots 7, 8 and 9 between the wing tip and the termination of partition 26 on the chordwise line extending across the slots between the ends thereof. The portion of the blower inlet area between partitions 26 and 27 is proportioned to the area of the induction slots which lies between the chordwise lines corresponding to the respective ends of partitions 26 and 27 and extending across the slots. The rear portion of the blower inlet area is proportioned to the slot areas inboard of the outer end of partition 27.

It is not necessary that the several partitions extend to the trailing edge of the wing or even into the space directly beneath the surface slots of the wing. It is found desirable to have the partitions terminate forwardly of the slots with some space provided aft thereof for free circulation, to afford some spanwise adjustment of the static pressure within the wing, as may be required. It is important, however, that the partitions terminate at stations successively further towards the tip in progressing from the rear partition toward the forward partition.

By dividing the wing in this manner, the best distribution of suction is attained along the span of the wing and provides substantially improved flow and distribution, being particularly more desirable than the throttling procedures heretofore suggested.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination, a wing main body and a flap, means for supporting said flap in variable relation with said wing, said wing having a slot in its surface, means to produce a flow of air through said slot and spanwise through the wing interior, and a structural member extending chordwise within said wing having a cross section arched in the direction of flow, the maximum rise of the exterior contour of said arched section being substantially less than the downstream extent of said arched contour.

2. In combination, a hollow wing having a slot in its surface extending spanwise thereof and leading into the wing interior, blower means having a flow passage in communication with said wing interior to cause a flow of air through said wing interior and through said slot, a partition within said wing extending across said flow passage and spanwise along said wing to a chordwise line extending across said slot between the ends thereof, said partition dividing the area of said flow passage into component areas which are substantially proportional respectively to the areas of the segments of said slot on each side of said line to provide for regulated flow of air through said slot throughout the extent thereof, said partition terminating short of said slot leaving a free circulation space within which adjustment of the static pressure within said wing may occur.

3. In combination, a hollow wing having a slot in its surface extending spanwise thereof and leading into the wing interior, blower means having its inlet in communication with said wing interior to induce a flow of air into the wing interior through said slot, a plurality of partitions within said wing extending across said inlet to divide it into a plurality of component areas, said plurality of partitions extending spanwise of the wing and terminating in succession spanwise at increasing distances from said inlet area forming a series of open ended and clear and unobstructed flow passages.

EDWARD A. STALKER.